United States Patent [19]

Kryger

[11] Patent Number: 4,534,991

[45] Date of Patent: Aug. 13, 1985

[54] ASEPTIC JUICE OR BEVERAGE AND FLAVOR ENHANCEMENT SYSTEM THEREFOR

[75] Inventor: Allen C. Kryger, Holland, Mich.

[73] Assignee: Squirt & Company, Holland, Mich.

[21] Appl. No.: 524,096

[22] Filed: Aug. 17, 1983

[51] Int. Cl.³ .......................... C12G 3/12; A23L 2/00
[52] U.S. Cl. ............................... 426/592; 426/330.4; 426/330.5; 426/387; 426/399; 426/492; 426/599
[58] Field of Search ............... 426/330.3, 330.4, 330.5, 426/592, 599, 386, 399, 387, 429, 492, 490, 493, 494, 521, 651, 655

[56] References Cited

U.S. PATENT DOCUMENTS

| | | | |
|---|---|---|---|
| 950,950 | 3/1910 | Oehme | 426/387 |
| 981,405 | 1/1911 | Fernbach | 99/205 |
| 1,214,134 | 1/1917 | Cheney | 99/155 |
| 1,384,680 | 7/1921 | Smith | 426/651 |
| 1,602,183 | 10/1926 | Thomssen | 426/651 |
| 1,715,932 | 6/1929 | Kokatnur | 99/205 |
| 1,735,118 | 11/1929 | Kunz | 99/155 |
| 1,956,770 | 4/1934 | McCrosson | 99/8 |
| 1,958,232 | 5/1934 | Burkart | 99/11 |
| 2,187,572 | 1/1940 | Meinzer | 99/155 |
| 2,190,991 | 2/1940 | Meinzer | 99/155 |
| 2,216,295 | 10/1940 | Meinzer | 99/155 |
| 2,374,219 | 4/1945 | Lee | 99/155 |
| 2,435,744 | 2/1948 | Hartman | 426/651 |
| 2,641,550 | 6/1953 | Dykstra | 99/205 |
| 2,666,707 | 1/1954 | Beu | 99/140 |
| 2,724,652 | 11/1955 | Brent et al. | 99/205 |
| 2,793,125 | 5/1957 | Keller | 99/155 |
| 3,087,822 | 4/1963 | Smith et al. | 99/155 |
| 3,120,442 | 2/1964 | Ostrus | 99/103 |
| 3,248,233 | 4/1966 | Brent et al. | 426/387 |
| 3,391,009 | 7/1968 | Fehlberg et al. | 99/205 |
| 3,782,972 | 1/1974 | Atkins et al. | 426/192 |
| 3,787,593 | 1/1974 | Atkins et al. | 426/429 |
| 3,852,476 | 12/1974 | Nagano et al. | 426/7 |
| 3,873,747 | 3/1975 | Evert | |
| 3,908,031 | 9/1975 | Wistreich et al. | |
| 4,340,628 | 7/1982 | Gilbertson et al. | 424/49 |
| 4,376,126 | 3/1983 | Evers | 426/399 |

*Primary Examiner*—Raymond Jones
*Assistant Examiner*—Marianne M. Cintins
*Attorney, Agent, or Firm*—Price, Heneveld, Huizenga & Cooper

[57] ABSTRACT

The specification discloses a process for making an aseptic juice, orange juice being specifically disclosed, wherein an aseptic flavor system is created by adding a high proof alcohol to flavor concentrate ingredients, with the resulting aseptic flavor system being added to a previously pasteurized, drinkable strength juice. The resulting mixture is thereafter not heated for any purpose and is aseptically packaged to yield an aseptic finished product.

19 Claims, 2 Drawing Figures

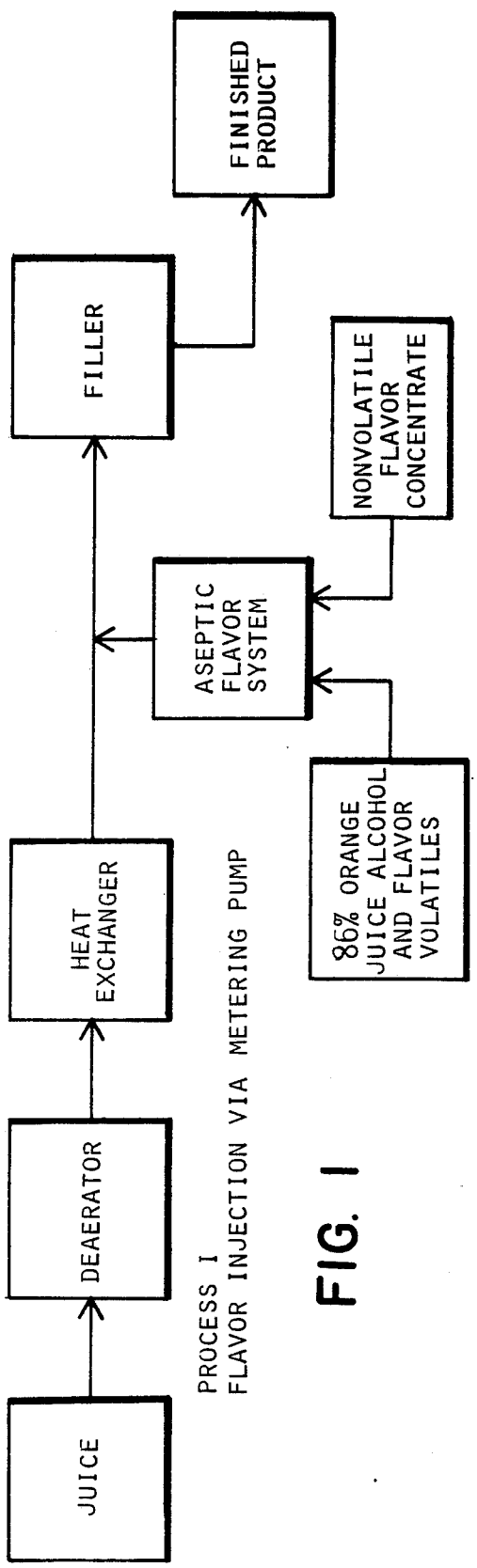
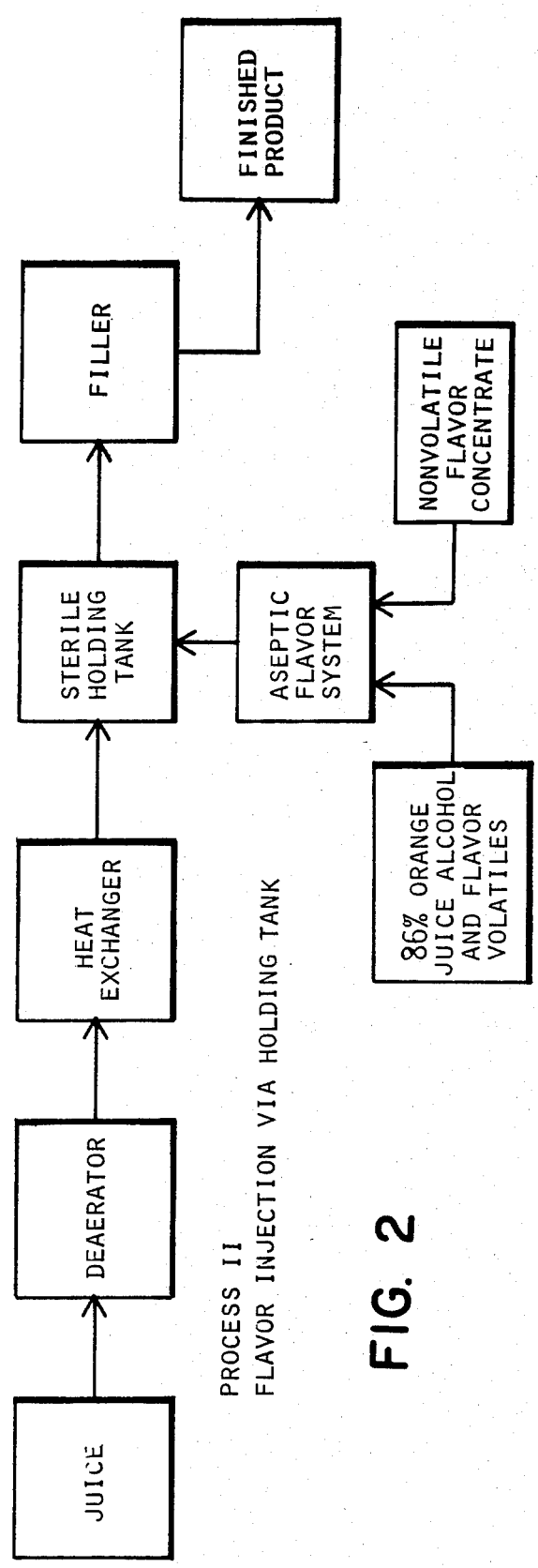

ASEPTIC JUICE OR BEVERAGE AND FLAVOR ENHANCEMENT SYSTEM THEREFOR

BACKGROUND OF THE INVENTION

The present invention relates to fruit juices or fruit drinks, especially pasteurized, ready to drink juices. The invention specifically relates to orange juice, though in its braoder aspects it is applicable to other beverages and juice drinks.

Orange juice is purchased by the consumer either as frozen concentrate or as pasteurized, ready to drink juice, either refrigerated or off the shelf. There are several advantages to purchasing ready to drink juice. First, of course, that there is no preparation necessary. Secondly, the ready to drink juice can be sold in convenient individualized containers, whereas even the smallest cans of frozen orange juice typically make about 24 ounces of juice. Finally, a properly pasteurized orange juice can actually be shelf stable without refrigeration.

The disadvantage of ready to drink orange juices, especially if they are pasteurized to such a degree that they can be shelf stable, is that they do not taste like fresh orange juice. It has been well-known for years that pasteurization destroys or drives off, at least to a significant degree, the flavor ingredients which give fresh orange juice its desirable flavor and aroma.

In recognition of this problem, orange juice is typically concentrated in a vacuum chamber so that less heat is required to drive off water. Further, flavor volatiles which are removed during concentration in an evaporator are usually condensed in a fractionating column, along with natural alcohol normally present in orange juice to form a 10 to 15% alcohol solution. The concentrated juice is then often pasteurized at least to some degree and the previously distilled flavor essence is added back to the juice after pasteurization. The resulting mixture is then preserved by freezing.

So called essence oil, another flavor ingredient, is immiscible with the 15% alcohol solution and is physically separated from the distilled alcohol, flavor ingredient solution. Fragrant and flavorful oils from the orange peels (peel oils) are also saved. These oil flavor ingredients, both peel and orange juice oil, are also often added back into the concentrated juice prior to freezing.

Pasteurized, ready to drink juices are typically shipped as pasteurized or frozen concentrate. They are then reconstituted with water at plants located near the ultimate market. The water soluble and oil soluble flavor ingredients are typicaly added back to the juice during reconstitution with water and the resulting reconstituted juice must again be pasteurized before the product can be placed in the stores. Pasteurization is especially required if the juice is to be shelf stable to any degree.

Unfortunately, the pasteurization of the final drinkable strength juice either destroys or drives off the flavor ingredients.

This problem has been recognized by prior artisans for many years. However, no satisfactory solutions have ever been achieved. Consequently, orange juice is most typically sold as a frozen concentrate or as a non-pasteurized, mildly pasteurized or partially pasteurized juice which must be refrigerated and marketed relatively rapidly. Products sufficiently aseptic to have any shelf lift without refrigeration have not been sufficiently flavorful to garner any significant share of orange juice market.

SUMMARY OF THE INVENTION

In the present invention, aseptic fluit juice or drink is produced by creating a sterile flavor system by adding a sufficient quantity of a sufficiently high proof ethyl alcohol to the concentrated juice flavor ingredients to yield a flavor system that is self sterilizing. This aseptic flavor system is then added to a previously pasteurized juice. One then avoids excessive heating for any purpose after the flavor system has been added.

In its narrower aspects, the present invention is particularly unique as applied to orange juice in that a relatively significant quantity of very high proof alcohol can be distilled from orange juice. By adding orange juice alcohol to other orange juice flavor ingredients and then adding the resulting sterile system back into a pasteurized body of juice, one obtains a product containing all natural orange juice ingredients. The resulting product can be appropriately sold as an orange juice, rather than as an orange drink as is the case where ingredients which do not normally occur in the juice are added to the product during processing.

The method of the present invention results in an aseptic, shelf stable fruit juice or drink which tastes considerably more like fresh orange juice than any pasteurized product heretofore placed on the market. These and other objects, aspects and features of the invention will be more fully discussed below in the description of the preferred embodiment.

BRIEF DESCRIPTION OF THE DRAWINGS

FIG. 1 is a flow sheet showing one method for injecting the aseptic flavor system into the pasteurized juice; and FIG. 2 is a flow sheet showing an alternative method for introducing the aseptic flavor system into the sterilized juice.

DESCRIPTION OF THE PREFERRED EMBODIMENT

In the most preferred embodiment, a high proof orange juice alcohol containing distilled orange juice flavoring ingredients is added to other flavor ingredient concentrates such as a typical orange cold pressed oil (peel oil) and/or an orange essence oil (juice oil). A sufficient quantity of a sufficiently high proof orange juice alcohol is used so that the resulting flavor is self sterilizing. The resulting aseptic flavor system is then added to an already pasteurized and deaerated juice, either through injection via a metering pump (FIG. 1) or via injection into a holding tank (FIG. 2), and the resulting mixture is then processed through a sterilized filler without further heating.

The alcohol concentration in the final flavor system, prior to adding to the juice, must be sufficiently high to render the flavor system self sterilizing and aseptic. The precise percentage of alcohol necessary in a solution to render it aseptic may vary depending on what the other ingredients in solution are. Thus less alcohol may be required where the other ingredients are largely juice flavor oils rather than water. However, it is generally accepted that the alcohol concentration must be about 70% in order for a solution to be self sterilizing and aseptic.

The alcohol itself must thus be somewhat higher in concentration initially so that it will not be unduly diluted by the ingredients to which it is added. Since the other ingredients may comprise up to about 18% of the flavor system, the initial alcohol should be at least about 85% concentrated so that the final system will be in excess of about 70% alcohol. Also, at least about 85% concentrated alcohol is helpful in dissolving some of the oil flavor ingredients into the flavor system.

A high proof alcohol can be recovered from the orange juice concentration process. The water and other volatiles distilled from the juice during concentration are first collected at about 15% alcohol concentration and the nondissolved juice oil is physically separated. The remaining alcohol/water solution is then further fractionally distilled to separate unwanted water and yield an alcohol/flavor ingredient solution which comprises approximately 85 to 95% or greater alcohol. Typically, prior artisans do not concentrate such solutions to more than about 15% alcohol. However, higher concentrations are readily feasible and an 86% alcohol content flavor ingredient product is commercially available.

As noted, such an orange juice alcohol solution includes other concentrated flavor ingredients. A typical analysis for such an alcohol/flavor ingredient solution which would be acceptable in practicing the present invention would be as follows:

Alcohol Content (as determined by specific gravity): 86%
Acetaldehyde Content (greater than): 3000 ppm
Oil Content (calculated as limonene): 1–3%

The particular oil flavor ingredients to which the high proof alcohol is added will vary depending on the taste of the person or persons responsible for blending the juice. It is not really possible to say that one flavor ingredient is preferred over another, since this is a very subjective determination.

However, a typical orange cold pressed oil which could be used in the present invention has the following typical specifications:

Aldehyde (calculated as decyl): 1.4%
Refractive Index ($N_D^{20}$): 1.4712
Evaporative Residue: 2.2
Limonene: 97–98%

A typical orange essence oil acceptable in the present invention has the following specifications:

Aldehyde (calculated as decyl): 1.4%
Refractive Index ($N_D^{20}$): 1.4720
Evaporative Residue: 0.3%
Limonene: 97–98%

These concentrated, orange flavor oils are readily available commercially from a number of sources. One can of course vary the ultimate flavor of the product achieved by the present invention by selecting different flavor concentrates from different sources. The specific flavor concentrates employed are not critical to practicing the method of the present invention. The point of the present invention is that not matter which specific flavor concentrates are used, the ultimate juice or drink product will be more flavorful than aseptic products made in accordance with prior art techniques. Within that broad parameter, one can of course vary the specific quality of the product considerably based on the selection of different flavor concentrates.

A typical aseptic flavor system made in accordance with the present invention will comprise from about 82 to about 93% of the orange juice alcohol, from about 7 to about 18% of the oil flavor ingredients. This may be divided between the orange cold pressed oil and the orange essence oil in any manner the "taster" sees fit. While variations of these ranges may be considered desirable by other artisans, it should be kept in mind that the alcohol content of the ultimate flavor system must be of sufficiently high alcohol content to be self sterilizing. As noted above, this is thought to be at least about 70% ethyl alcohol. If the alcohol content is allowed to fall below that norm, the flavor system will be of questionable sterility. The resulting end product may very well not be aseptic.

Further, it is critical that the several ingredients which make up the aseptic flavor system be mixed before any of the flavor components are added to the juice. This gives the alcohol the opportunity to sterilize all of the flavor concentrate ingredients used. If the ingredients were added to the juice separately, the alcohol would be so greatly diluted that it would have no sterilizing benefit.

In some cases, the flavor ingredients may not be 100% soluble in the alcohol. In such a case, the flavor system will have to be added to the juice in a bulk process as in FIG. 2. Alternatively, one might keep the flavor system thoroughly agitated during metering addition (FIG. 1) to insure uniformity of the suspension. However, for metering addition as in FIG. 1, it would probably be best to insure uniformity by separating the insolubles, as by centrifuging or decantation.

The orange juice used will typically be a reconstituted concentration, though fresh juice could readily be employed in the present invention. The juice is preferably at its drinkable concentration at the time of pasteurization. The term "drinkable concentration" is used to refer to the fact that there is no need to further dilute the juice after it has been pasteurized.

Once the juice is reconstituted with water, it is passed through a deaerator as is customary. This removes oxygen from the juice and prevents adverse oxidation of flavor and/or other ingredients in the juice. This is a commonly used procedure in the juice art.

The resulting deaerated juice is passed through a pasteurizing heat exchanger. The juice must be elevated to a temperature sufficiently high to render the product commercially sterile. Typically, orange juice is considered sterilized when it has been elevated to a temperature of over approximately 190 degrees F. (88° C.).

The sterilized product is then cooled while maintaining the sterile condition, and the aseptic flavor system is added directly to the juice. The addition can occur in a continuous flow system or in a batch system, as indicated by comparing FIGS. 1 and 2. In a continuous flow system, the aseptic flow system is injected into a stream of juice through a metering pump. In a bulk process (FIG. 2), the juice is pumped into a sterile holding tank and the aseptic flavor system is added into the sterile holding tank. In either case, the ultimate percentage of the aseptic flavor system in the juice will be a function of the taste of the artisan or artisans creating the juice product. Typically, however, the percentage of the aseptic flavor system in the juice will probably fall within the range from about 0.1 to about 0.15% of the final juice product. As is known in the art, one limiting factor is that one does not want the final oil content calculated as limonene to exceed about 0.03%, as this gives the juice a burning taste or sensation.

The resulting mixture of pasteurized juice and aseptic flavor system is then packaged in an aseptic filling apparatus. Such equipment is known in the art and various alternative arrangements are commercially available.

The aseptic flavor system does not have to be passed through a microfilter as it is already aseptic. This is an important advantage in that such fine filters are easily clogged. The filling system then must be shut down, filter removed and replaced, and then resterilized before again using.

The finished product is an aseptic orange juice which is considerably more flavorful than prior art aseptic orange juices. In my opinion, an aseptic juice made in accordance with the process of the present invention can be made as flavorful as the best frozen concentrate products currently available on the market. Yet, the resulting product is a completely natural product. All of the ingredients come from fresh squeezed oranges. The resulting product can accurately be identified as orange juice, rather than as merely an orange drink.

OTHER JUICES AND DRINKS

While the present invention is uniquely suited to orange juice because of the fact that a very high concentrated alcohol solution can be distilled from orange juice, the invention is applicable to other juices and drinks in its broader aspects. Any food grade, highly concentrated ethyl alcohol can be added to the flavor concentrates of a particular juice, and the resulting aseptic flavor system added to the juice after it has been pasteurized. The basic parameters are that the alcohol content of the aseptic flavor system would have to be above about 70% as measured by specific gravity after all of the flavor ingredients have been mixed together. The resulting aseptic flavor system is added to the drinkable strength beverages or juice after pasteurization and cooling, and no further heating is conducted on the product. The product is aseptically filled in containers as described above.

The ethyl alcohol used can come from any source. In this broader aspect of the invention, it should either be substantially free of any flavor ingredients, or alternatively any flavor ingredients contained in the alcohol per se should be those considered complementary to or desirable in the juice product which one is producing.

In its broader aspects, this invention could thus be used to process apple juice, grape juice, lemon juice, and numerous other types of juices. Also while the invention is particularly well suited to making drinkable strength juices or beverages, it can also be used in its broader aspects to produce concentrates. Hence as broadly used herein, the term "juice" encompasses either a concentrate or a drinkable strength juice.

While prior artisans have heretofore used alcohol to extract essential flavor ingredients from juices, the alcohol concentration of the resulting flavor system has typically been between about 15 and 30%. Such a concentration is not sufficiently high to render the system aseptic.

Similarly, alcohol is sometimes collected along with volatiles during the process of juice concentration. The alcohol concentration of such mixtures is typically between about 5 and about 15%. Even where prior artisans have concentrated the alcohol in such volatile flavor systems to concentrations in excess of 70%, the resulting alcohol mixtures have not heretofore been used to add to other flavor components to create an aseptic flavor system. Nor have high alcohol and flavor volatile mixtures been used as aseptic flavor systems in and of themselves for adding to previously pasteurized juices for subsequent aseptic packaging.

Of course, it is understood that the above is a description of preferred embodiments of the invention and that various changes and alterations can be made without departing from the spirit and broader aspects thereof as defined by the following claims.

The embodiments of the invention in which an exclusive property or privilege is claimed are defined as follows:

1. A method for preparing an aseptic fruit juice or beverage comprising:

creating an aseptic flavor system by adding sufficient ethyl alcohol of sufficiently high proof to concentrated juice flavor ingredients to yield a flavor system which comprises at least 70% ethanol;

adding sufficient amounts of said aseptic flavor system to a previously pasteurized juice which has been pasteurized to a sufficient degree to render it commercially sterile and aseptic, to form a flavored juice, said amounts sufficient to impart a desired flavor to the juice;

and avoiding heating to pasteurization temperatures after said aseptic flavor system has been added to said juice.

2. The method of claim 1 wherein said juice employed is orange juice and said alcohol is obtained by distillation from orange juice and concentrating the alcohol content of the distillate sufficiently high that when it is added to said concentrated flavor ingredients, the resulting mixture will have an ethanol content of at least about 70%.

3. The method of claim 2 in which said ethyl alcohol is distilled along with volatile flavor ingredients such that the alcohol contains volatile flavor ingredients in solution following distillation and concentration.

4. The method of claim 3 in which said alcohol with volatile flavor ingredients in solution is added to oil flavor ingredients to yield said aseptic flavor system.

5. The method of claim 4 wherein the alcohol content of said ethyl alcohol after it is distilled from orange juice and concentrated is at least about 85% ethyl alcohol.

6. The method of claim 5 in which the resulting mixture of juice and aseptic flavor system is aseptically packaged.

7. The method of claim 6 in which said juice is pasteurized at drinkable strength whereby further dilution is not necessary to create a drinkable juice or drink.

8. The method of claim 1 in which said juice is pasteurized at drinkable strength whereby further dilution is not necessary to create a drinkable juice or drink.

9. The method of claim 8 wherein said juice employed is orange juice and said alcohol is obtained by distillation from orange juice and concentrating the alcohol content of the distillate sufficiently high that when it is added to said concentrated flavor ingredients, the resulting mixture will have an alcohol content of at least about 70%.

10. The method of claim 9 in which said ethyl alcohol is distilled along with volatile flavor ingredients such that the alcohol contains volatile flavor ingredients in solution following distillation and concentration.

11. The method of claim 10 in which said alcohol with volatile flavor ingredients in solution is added to oil flavor ingredients to yield said aseptic flavor system.

12. The method of claim 11 in which the resulting mixture of juice and aseptic flavor system is aseptically packaged.

13. The method of claim 8 in which the resulting mixture of juice and aseptic flavor system is aseptically packaged.

14. The method of claim 1 in which the resulting mixture of juice and aseptic flavor system is aseptically packaged.

15. The method of claim 14 wherein said juice employed is orange juice and said alcohol is obtained by distillation from orange juice and concentrating the alcohol content of the distillate sufficiently high that when it is added to said concentrated flavor ingredients, the resulting mixture will have an ethanol content of at least about 70%.

16. The method of claim 15 in which said ethyl alcohol is distilled along with volatile flavor ingredients such that the alcohol contains volatile flavor ingredients in solution following distillation and concentration.

17. The method of claim 16 in which said alcohol with volatile flavor ingredients in solution is added to oil flavor ingredients to yield said aseptic flavor system.

18. A method for preparing aseptic fruit juice, comprising:

providing a water soluble juice flavor fraction having a naturally occurring alcohol content;

providing an oil soluble juice flavor fraction;

increasing the alcohol concentration of said water soluble fraction until the concentration is at least about 70%;

mixing the water soluble juice flavor fraction and oil soluble fraction such that the combined juice flavor fractions is at least 70% alcohol, thereby rendering the mixture self sterilizing and aseptic;

adding sufficient amounts of said combined juice flavor fractions to a previously pasteurized fruit juice, which has been pasteurized to a sufficient degree to render it commercially sterile and aseptic, to form a flavored juice, said amounts sufficient to imparta desired flavor to the juice;

and avoiding heating to pasteurization temperatures after said flavor fractions are mixed with said pasteurized juice.

19. The method for preparing aseptic fruit juice recited in claim 18 wherein said oil soluble fraction is not heated by any external heat source.

* * * * *

UNITED STATES PATENT AND TRADEMARK OFFICE
CERTIFICATE OF CORRECTION

PATENT NO. : 4,534,991

DATED : August 13, 1985

INVENTOR(S) : Dr. Allen C. Kryger

It is certified that error appears in the above-identified patent and that said Letters Patent is hereby corrected as shown below:

Column 1, line 9:

"braoder" should be --broader--

Column 1, line 68:

"lift" should be --life--

Column 2, line 5:

"fluit" should be --fruit--

Column 2, line 49:

after "flavor" insert --system--

Column 3, line 57:

"not" should be --no--

Column 4, line 29:

"concentration," should be --concentrate,--

Column 8, Claim 18, line 12:

"pasteruized" should be --pasteurized--

UNITED STATES PATENT AND TRADEMARK OFFICE
CERTIFICATE OF CORRECTION

PATENT NO.  : 4,534,991
DATED       : August 13, 1985
INVENTOR(S) : Dr. Allen C. Kryger It is certified that error appears in the above-identified patent and that said Letters Patent is hereby corrected as shown below:

Column 8, Claim 18, line 16:

"imparta" should be --impart a--

Signed and Sealed this

Eleventh Day of February 1986

[SEAL]

Attest:

DONALD J. QUIGG

*Attesting Officer*          *Commissioner of Patents and Trademarks*